United States Patent [19]

Pagel

[11] 4,097,168

[45] * Jun. 27, 1978

[54] PRESTRESSED CONNECTION AND FASTENER THEREFOR

[75] Inventor: Paul V. Pagel, Fullerton, Calif.

[73] Assignee: Microdot Inc., Greenwich, Conn.

[*] Notice: The portion of the term of this patent subsequent to Mar. 22, 1994, has been disclaimed.

[21] Appl. No.: 779,846

[22] Filed: Mar. 21, 1977

Related U.S. Application Data

[63] Continuation-in-part of Ser. No. 616,131, Sep. 24, 1975, Pat. No. 4,012,884, which is a continuation of Ser. No. 182,535, Sep. 21, 1971, abandoned.

[51] Int. Cl.² .............................................. B25G 3/36
[52] U.S. Cl. ...................................... 403/388; 85/19; 151/41.73
[58] Field of Search .......................... 85/19; 151/41.73

[56] References Cited

U.S. PATENT DOCUMENTS

| | | | |
|---|---|---|---|
| 519,411 | 5/1894 | North et al. | 151/41.73 |
| 2,223,871 | 12/1940 | Johnson | 85/19 |
| 2,307,080 | 1/1943 | Schaefer | 151/41.73 UX |
| 3,124,189 | 3/1964 | Dietlein | 151/41.73 UX |
| 3,174,523 | 3/1965 | Hult | 151/41.73 UX |
| 3,418,012 | 12/1968 | LaTorre | 85/19 X |
| 3,456,972 | 7/1969 | Drotar | 151/41.73 X |
| 4,012,884 | 3/1977 | Pagel | 403/408 |

FOREIGN PATENT DOCUMENTS

| | | | |
|---|---|---|---|
| 399,985 | 10/1933 | United Kingdom | 151/41.73 |
| 399,979 | 10/1933 | United Kingdom | 151/41.73 |
| 399,080 | 10/1933 | United Kingdom | 151/41.73 |
| 400,105 | 10/1933 | United Kingdom | 151/41.73 |

*Primary Examiner*—Wayne L. Shedd
*Attorney, Agent, or Firm*—Harness, Dickey & Pierce

[57] ABSTRACT

The disclosure relates to a fastener for use in highly stressed connections particularly in environments and with materials susceptible to stress corrosion or delamination. The fastener is installed in aligned openings in abutting components and exibits an interference fit therewith to maximize fatigue life of the connection. The interference fit is controlled in a unique manner.

4 Claims, 18 Drawing Figures

PRESTRESSED CONNECTION AND FASTENER THEREFOR

REFERENCE TO RELATED APPLICATIONS

This application is a continuation-in-part of application Ser. No. 616,131, filed Sept. 24, 1975, entitled "Prestressed Connection and Fastener Therefor", patented Mar. 22, 1977, U.S. Pat. No. 4,012,884, which was a continuation of application Ser. No. 182,535, filed Sept. 21, 1971 and abandoned Sept. 24, 1975.

BACKGROUND OF THE INVENTION

Various types of fasteners have been used heretofore to prestress components to maximize fatigue life. However, when the components to be fastened are fabricated from a metal prone to develop stress corrosion, or when such materials are composites, e.g., carbon filament reinforced plastics, consideration must be given to the contro of such prestress to minimize stress corrosion or delamination, respectively. The elimination of stress corrosion is critical in contemporary aircraft, particularly the highly stressed portions thereof, such as the wing and tail structures.

The aircraft has long been aware of stress corrosion developing in fabricated aluminum assemblies, although its effects were usually minimal in smaller aircraft utilizing relatively thin sheets of aluminum. As the size of commercial and military aircraft has increased, the thickness of sheet aluminum components used in the wing and tail structures has also significantly increased. Previously, many applications required only thin sheets of aluminum, for example, one-eighth inch thick whereas designs now require aluminum plates and extrusions one-fourth inch thick and larger. In the art of fabricating structures of heavy aluminum plate, one design objective is to minimize the possibility of stress corrosion in the fabricated article, particularly at the points of bolted connections which must withstand high stresses during their service life. Stress corrosion is an interaction between sustained surface tension, stress, and corrosive attack resulting in cracking and premature embrittlement failure of a normally ductile material. The impurities of alloying elements establish paths along which cracks develop. While the actual mechanism appears to combine electrochemical action with stress sorption, several theories have been advanced as to the phenomenon that occurs.

In one theory, galvanic action occurs between local anodic (positive) areas and more cathodic (negative) areas of the metal surface. With the formation of corrosion tunnels plus high stress acting to pull the metal apart, cracks develop. In nonsimilar metal alloys, the cracks follow grain boundaries, which act as anodes with the grains acting as cathodes.

In another theory, certain ions from the atmosphere are absorbed along the walls and in the tips of cracks, lowering the binding energy between surface atoms to the extent that the cracks grow.

Before stress corrosion occurs there is usually a combination of a corrosive environment, material susceptibility, and stress. All are related to each other and to time, the more severe the environment or more susceptible the material, the less stress required for a given time.

Prevention of stress corrosion requires control of surface tension stress, residual or applied, that acts continuously, especially in the short transverse grain flow direction. Where stress corrosion is present, failure stress in some materials may be less than 10 percent of the design strength when applied across the grain in the short transverse direction.

The problem of stress corrosion is aggravated in connections that are prestressed to improve fatigue life, as is found in many aircraft applications. The present invention solves this problem by controlling prestress in a manner that minimizes the possibility of stress corrosion.

With respect to composites, excessive radial stress on the composite material surrounding the fasteners may induce mechanical delamination thereof.

Known fasteners for use in highly stressed assemblies generally employ a tapered shank which gradually stresses the material surrounding the hole formed in abutting components. A specific example of such tapered fasteners used in a tapered hole formed in abutting components in whch an interference fit was intended between the hole and the fastener, is that shown in U.S. Pat. No. 3,034,611 to Zenzic. While initially accepted, it has been found that the manufacturing costs incurred in the preparation of the receiving holes to preclude excessive prestress as well as critical procedures to be followed in making the bolted connection resulted in extremely high production costs. Other forms of tapered fasteners also had similar undesirable manufacturing costs. Much of the high cost was required in precise preparation of the receiving hole, during which the hole was necessarily reamed following a drilling operation. The reaming required precise and close tolerances so as to provide the desired interference fit between the tapered shank of the fastener and the metal surrounding the hole formed in the objects to be connected thereby without incurring excessive prestress.

SUMMARY OF THE INVENTION

A fastener, in accordance with the present invention, forms a controlled prestressed connection between abutting members. The fastener comprises a shank in the general configuration of a right circular cylinder provided with a plurality of uniformly circumferentially spaced lobes extending axially from the head end toward the fastening end. The lobes cause a controlled prestress to the point of plastic deformation of the material surrounding the hole into which it is inserted so as to precisely prestress the material and thereby to improve fatigue life of the connection yet control stress corrosion where the materials are susceptible to stress corrosion or preclude delamination in composite materials.

DETAILED DESCRIPTION OF THE PREFERRED FORMS OF THE INVENTION

Figure 1:
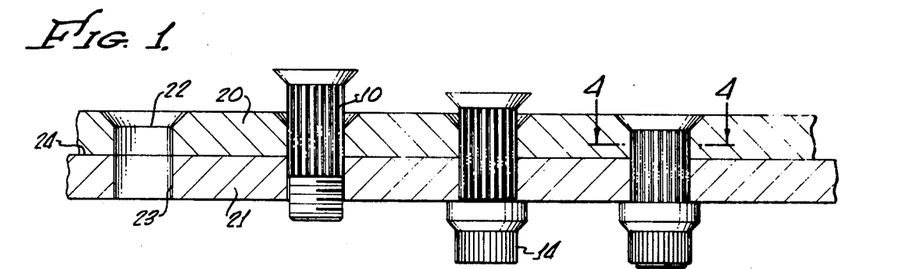
FIG. 1 is a vertical section showing two plates which are to be secured together by fasteners embodying the present invention, showing the sequential stages in which the fastener is assembled, and the resulting connection of the present invention.
Figures 2, 3, 4:
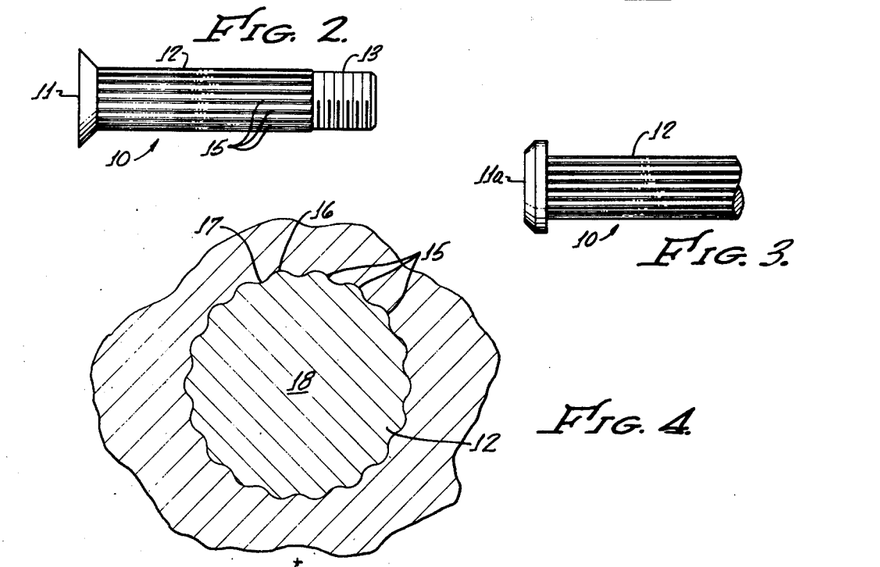
FIG. 2 is an elevational view of one of the fasteners of FIG. 1.
FIG. 3 is a fragmentary elevational view showing a modified form of the head of the fastener of FIG. 2.
FIG. 4 is a transverse sectional view, slightly enlarged, and taken on line 4—4 of FIG. 1.

Referring more particularly to FIGS. 1 and 2 of the drawings, a first embodiment of the fastener according to the present invention is shown in the form of a bolt generally indicated at 10. The bolt includes a head 11 integral with a shank 12 which terminates in a fastening portion 13. In the embodiment illustrated, the fastening portion is formed with a screw thread adapted to receive and cooperate with a female fastening element, such as a conventional nut 14. In the first embodiment, the head 11 is tapered to permit reception into an accommodating countersunk hole; in the second embodiment, the head, indicated at 11a, is of the protruding type.

In both embodiments, the shank 12 is in the general configuration of a right circular cylinder at a basic or nominal diameter, and the peripheral surface of the shank is provided with a plurality of uniformly circumferentially spaced lobes 15, axially extended between the head and the fastening portion 13 of the fastener.

Figure 5:
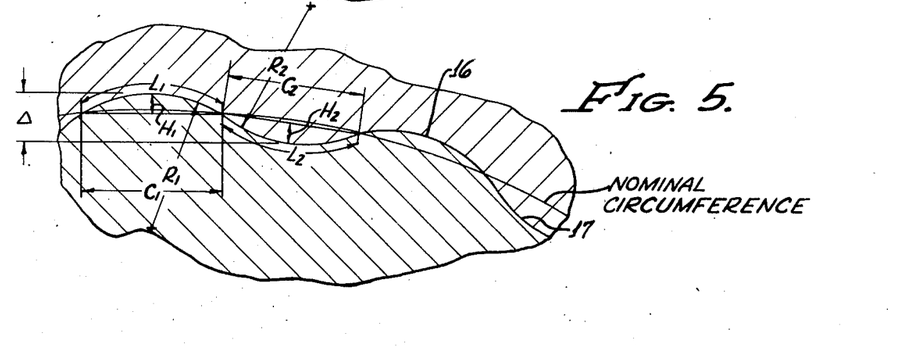
FIG. 5 is a greatly enlarged fragmentary view of FIG. 4 showing the external periphery of the fastener in contact with the material of one of the plates forming the receiving opening.

As more clearly illustrated in FIGS. 4 and 5, each of the lobes 15 include alternately circumferentially spaced crests or convex portions 16 and roots or concave portions 17. All of the crests and roots are radially spaced from said basic nominal diameter at substantially equal distances. This is illustrated schematically in FIG. 5, wherein the basic or nominal circumference of the right circular cylinder is substantially intermediate the radial limits of the crests 16 and roots 17 of the lobes 15, with reference to the longitudinal axis 18 of the shank 12.

As shown in FIG. 2, a series of fasteners 10 embodying the present invention are used to form a bolted connection between superimposed plates 20 and 21. Each of the plates are provided with respective fastener bores 22 and 23, which are preferably formed after the plates are superimposed thereby insuring proper alignment. The juncture line of the resulted bolted connection is indicated at 24.

As can be seen in FIG. 2, the shank 12 is tapered slightly in the transition area between the fastening portion and the lobed shank. It has been found that this transition area facilitates insertion if formed at approximately a 15° taper. Assembly of the bolted connection is accomplished by inserting the fastener 10 partially within the aligned holes 22 and 23. Since the lobes 15 are provided with crests 16 extending radially beyond the nominal circumference of the shank 12, which circumference serves as a reference standard for the formation of the holes 22 and 23 drilled at substantially the same nominal circumference, each fastener must be forced into the aligned holes. In actual practice, pneumatically driven hammers are used to insert a fastener into the aligned holes 22, 23 so as to forcibly seat the fastener in the position shown at the extreme right-hand side of FIG. 1. Upon seating of the fastener 10, the nut 14 is secured at the desired torque value to maintain the plates 20 and 21 in a securely bolted connection.

To provide optimum prestressing in a bolted connection using aluminum plates, I have determined that the installation holes 22, 23 may be drilled at the basic, or nominal, circumference identified in FIG. 5. The manufacturing tolerances maintained by contemporary machine shop practices permit a range of design limits for the lobes 15 to extend radially beyond the nominal circumference at a minimum distance of 0.0005 inch and at a maximum of 0.003 inch. Excellent prestressing of the plates 20, 21 has been accomplished by using a crest to root dimension of 0.003 inch; in that case, the radial limit of each crest 16 is 0.0015 inch, and the radial limit of each root 17 is 0.0015 inch.

These dimensions are achieved by rolling a shank previously formed at the nominal circumference so as to provide the configuration shown in FIGS. 2-5. The rolling apparatus is formed to provide a desired number of lobes, which number must be a whole integer. The lobes are formed at respective radii to provide alternate convex and concave lobes surfaces determined by a maximum radius equal to the basic diameter of the shank divided by a numerical value less than 8 for a 08-32 size bolt, or any smaller bolts; the maximum radius for the lobes of a 10-32 size bolt and larger, is equal to the basic, or nominal, diameter divided by a numerical value less than 5.

Equations usuable in determining the bolt parameters for a given hole are as follows:

$$P = \frac{\pi D}{N}$$

$$R = \frac{P^2}{16H} + \frac{H}{4}$$

wherein
$P$ = Pitch between convex lobes
$D$ = Bolt diameter
$N$ = Number of convex lobes
$R$ = Lobe radius
$H$ = Total height of lobes Parameters, applied to standard bolt sizes are:

| Size | Nominal Bolt Diameter D | Total Lobe Height $H = (H_1 + H_2)$ | Number of Convex Lobes N | Pitch Between Convex Lobes P | Lobe Radius R |
|---|---|---|---|---|---|
| −08 | .1625 | .0030 | 16 | .0319068003 | .02196 |
| −3 | .1885 | .0030 | 16 | .0370118884 | .02929 |
| −4 | .2485 | .0030 | 16 | .0487928609 | .05035 |
| −5 | .3110 | .0030 | 20 | .0488517657 | .05047 |
| −6 | .3735 | .0030 | 24 | .0488910356 | .05005 |
| −7 | .4360 | .0030 | 28 | .0489190856 | .05061 |
| −8 | .4980 | .0035 | 24 | .0615880475 | .07676 |

By extending radii $R_1$ and $R_2$ derived from the foregoing equations or chart, from centers spaced radially inwardly and outwardly from the nominal circumference of the bolt, the radius $R_1$ will generate the lobe surface designated $L_1$, which is the convex surface shown in FIG. 5. The radius $R_2$, located radially outwardly from the nominal bolt circumference will generate the concave surface $L_2$. As can be seen in FIG. 5, each of these arcs subtend respective chords $C_1$, $C_2$. The summation of chords $C_1$, $C_2$ is used as the divisor of the nominal circumference, determine the number of lobes which are uniformly, circumferentially spaced about the shank 12.

The respective crests and roots of each of the lobes 15 so provided are at radial distances from the nominal circumference designated in FIG. 5 as $H_1$ and $H_2$. As indicated above, the present invention can provide excellent and controlled prestressing of the plates 20 and 21 when the radial heights $H_1$ and $H_2$ are 0.0015 inch each so as to provide a crest-to-root dimension H of 0.003 inch.

Figure 12:
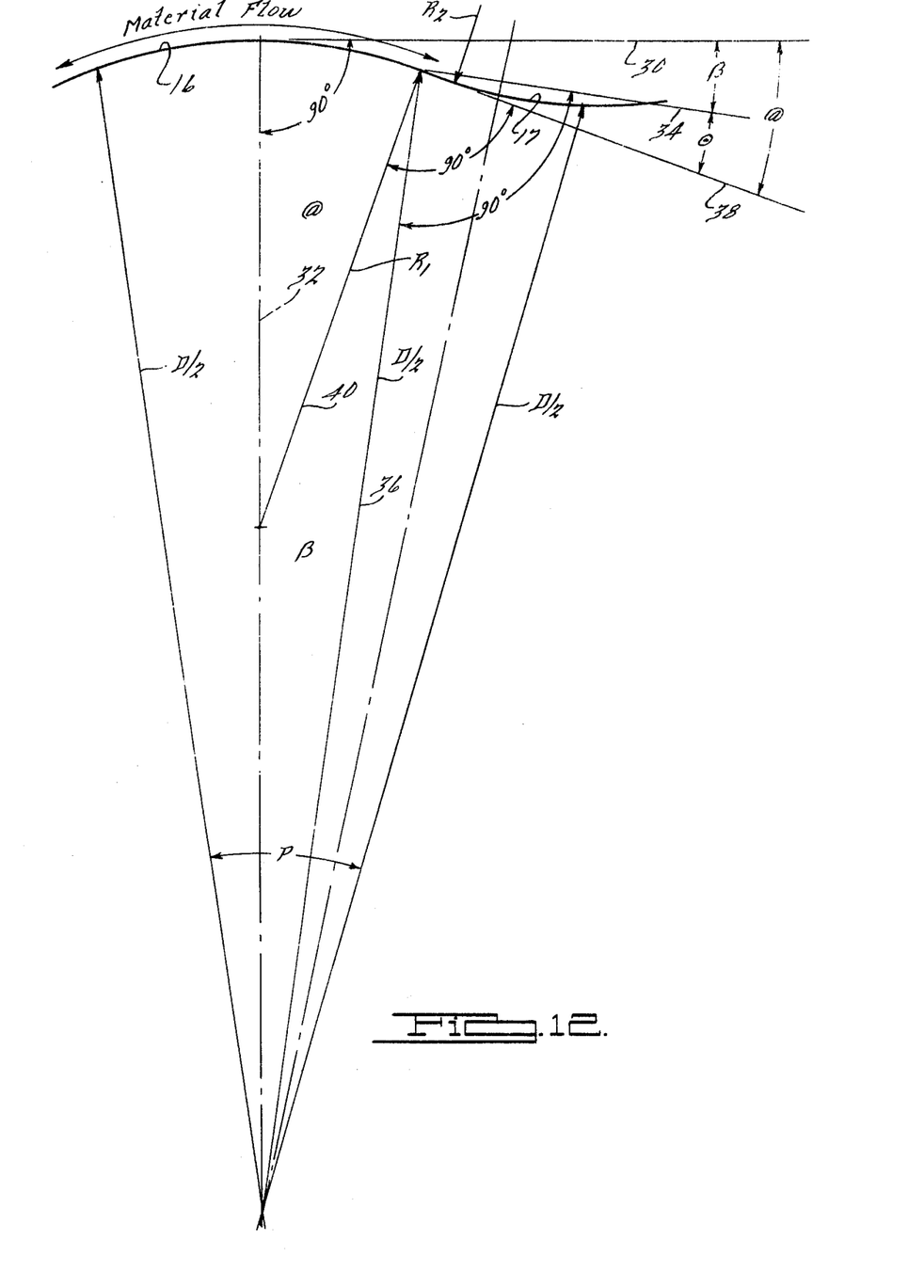
FIG. 12 is a diagrammatic presentation of the maximum angle of material flow.
Figure 13:
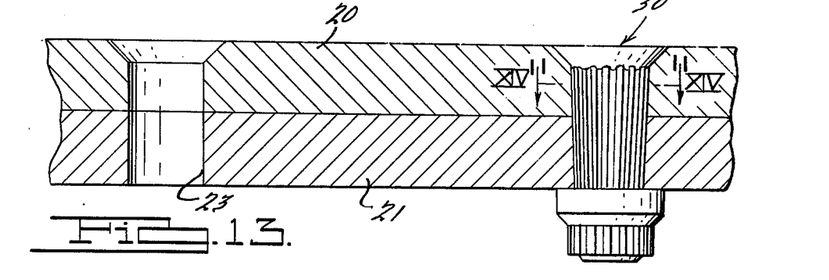
FIG. 13 is a partial sectional view similar to FIG. 1 showing work provided with straight cylindrical holes and a fastener of another modified form installed in one of the holes.
Figure 14:
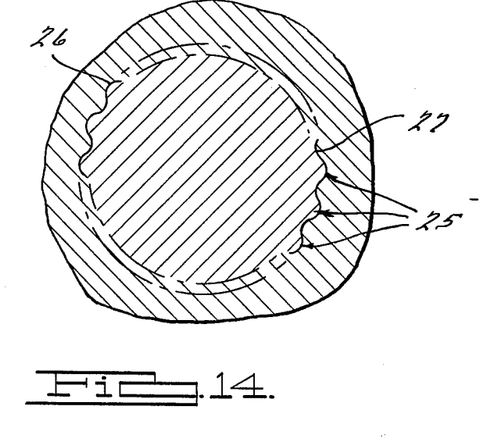
FIG. 14 is an enlarged cross section taken substantially on the line XIV—XIV of FIG. 13 and looking in the direction of the arrows.
Figure 15:
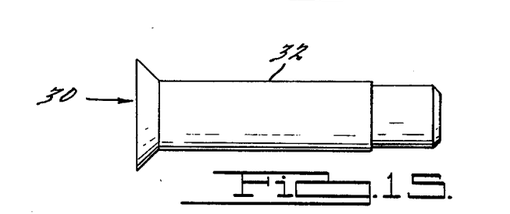
FIG. 15 is a side elevational view of a blank used in manufacture of modified fasteners of the type illustrated in FIGS. 13 and 16.

The advantages of the present invention in controlling prestress and thereby minimizing the possibility of stress corrosion or delamination can be seen from an analysis of the generalized lobe geometry shown in FIG. 12.

The lobe geometry of FIG. 12 was prepared for purpose of illustration by using a nominal bolt diameter of 0.250 inches, which approximates a size 4 bolt, the following lobe parameters can be developed:

$$P = \frac{\pi D}{N} = \frac{3.14 \times .250}{16} = .049 \text{ inches}$$

$$R = \frac{P^2}{16H} + \frac{H}{4} = \frac{(.049)^2}{16 \times .003} + \frac{.003}{4} = .05075 \text{ inches}$$

FIG. 12 is scaled up for purposes of illustration to indicate the angle $\theta$ of material flow of said 0.250 inch diameter bolt. Line 30 extends at an angle of 90° from center line 32 of the convex lobe 16. Line 34 extends at an angle of 90° from line 36 which is the radius D/2 of the bolt. Line 38 extends at an angle of 90° from line 40 which is the radius $R_1$ of the convex lobe 15. Angle $\theta$, therefore, is the difference arrived at by subtracting Angle B from Angle A and which represents the maximum angle of material flow at the point of transition between the convex lobe 16 and concave lobe 17.

By using the foregoing geometrical analysis, the maximum angle of material flow upon insertion of the fastener 10 into a workpiece can be developed for each of the aforesaid bolt sizes. The angles designated @ and B in the following table are represented in FIG. 12 which is specific to a 0.250 inch diameter bolt:

| Bolt Size | at | B | $\theta$ |
|---|---|---|---|
| 08 | 27° | 7° | 20° |
| 3 | 24° | 8° 15'' | 15° 45'' |
| 4 | 19° 45'' | 8° | 11° 45'' |
| 5 | 19° | 6° | 13° |
| 6 | 17° | 5° | 12° |
| 7 | 10° | 4° 15'' | 13° 45'' |
| 8 | 16° | 5° | 11° |

From an analysis of the foregoing table, it will be apparent that the angle $\theta$ represents the maximum angle of material flow at the point of transition between the convex lobes 16 and concave lobes 17 developed by the radii $R_1$ and $R_2$, respectively, and that said angle $\theta$ large enough to facilitate material flow yet small enough to preclude excessive stress concentration in the workpiece material at the point of engagement of the convex lobes 16 therewith.

The present invention was tested by using a bolt formed of titanium alloy and of a basic or nominal diameter of ¼ inch. The bolt shank was provided with uniformly spaced lobes, as indicated in FIGS. 2, 4 and 5, having a height differential of 0.003 inch between the crest and root of each lobe. The bolt so fabricated had lobe crests and lobe roots respectively radially spaced from the nominal circumference at 0.0015 inch.

The test bolt was forcibly driven into a series of aluminum test plates provided with aligned fastener receiving holes drilled at the nominal circumference of the fastener. After forcible insertion of the fastener within the aligned holes, a nut was secured to the threaded fastening portion of the fastener and a torque force appled thereto at a value normally encountered in contemporary aircraft bolt connections. The bolted test plates are photographically illustrated at a reduced scale in FIG. 6 of the drawing.

Figures 6, 7:
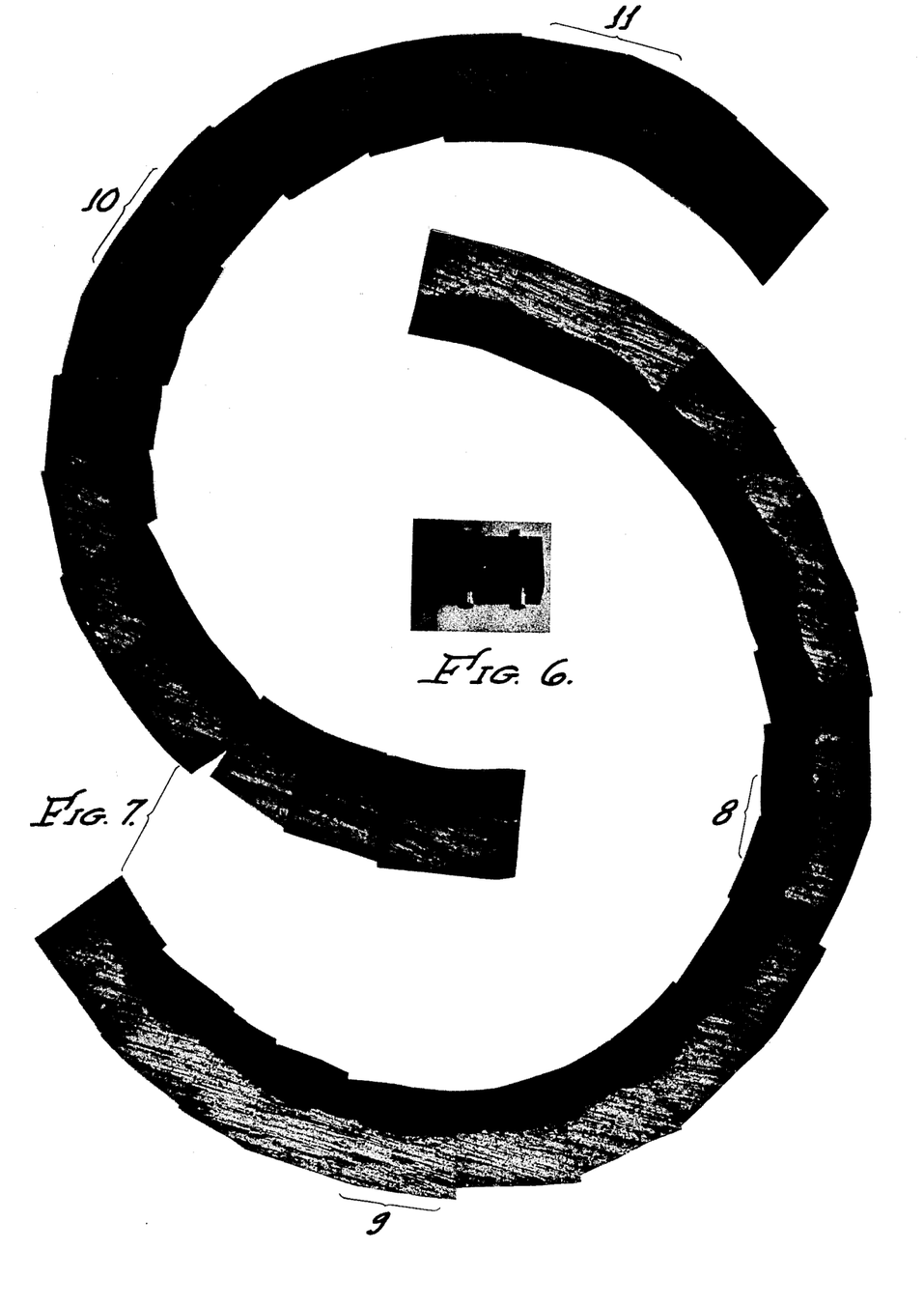
FIG. 6 is a reduced scale photograph of a series of aluminum test blocks connected by the present invention.
FIG. 7 is a composite microphotograph of the materials of the fastener and one of the blocks of FIG. 6, showing the respective abutting circumferential portions thereof.

Subsequently, the test plates were sectioned in a diametral plane located along the longitudinal axis of the shank intermediate the swaging area and the head of the fastener. The cross section of the plate was subsequently etched with a conventional Keller's etch and microphotographed at 85 times actual size at increments about the periphery of the sectional bolt shank. A composite of the series of microphotographs is shown in FIG. 7, which is approximately 30 times actual size. Selected portions of the composite microphotograph are shown at 85 times magnification in FIGS. 8, 9, 10 and 11 of the drawings.

Figure 8:
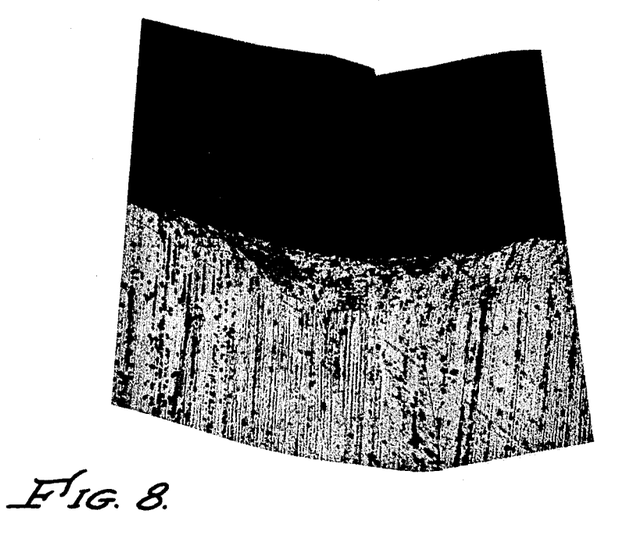
FIGS. 8, 9, 10 and 11 are selected portions of the composite microphotograph of FIG. 7 as indicated by the brackets and respectively corresponding numerals thereon, these portions are at a magnification of 85 times actual size following a conventional Keller's etch.
Figure 9:
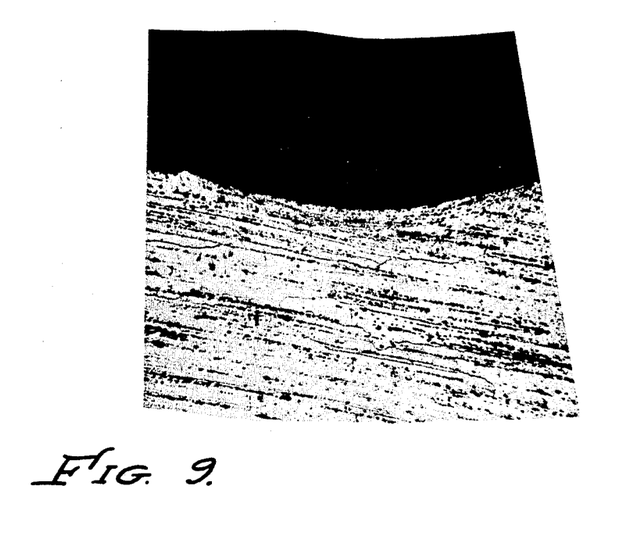
Figure 10:
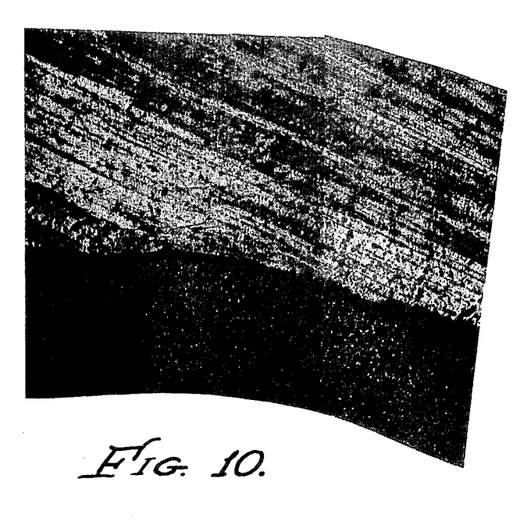
Figure 11:
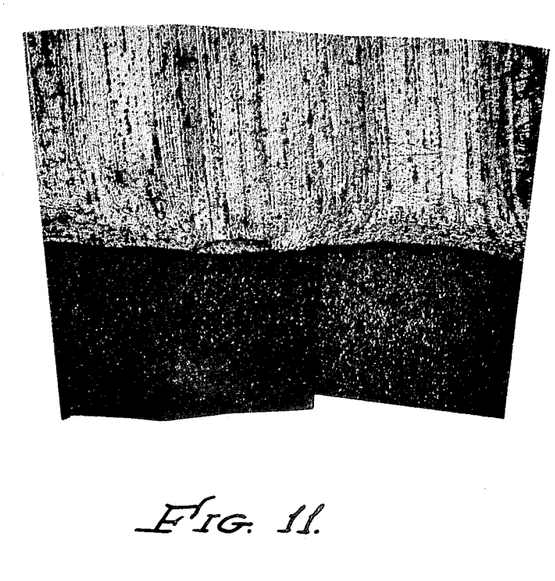

By referring to FIGS. 7–11, it can readily be seen that a fastener provided with the lobed configuration of the present invention insures the controlled compressive presetting of the material forming the fastener receiving bore. In the actual test plates, the material was 7075-T6 aluminum alloy, which is known to be susceptible to stress corrosion during its service life, particularly in the area referred to as the "short transverse grain structure". This structure is illustrated in FIGS. 8 and 10 of the drawings, which shows uniform contact of the plate material with the peripheral surface of the fastener.

Accordingly, a fastener for prestressing members connected thereby is provided, which effectively compresses the material of the components being fastened in the short transverse grain area so as to controllably and uniformly prestress the material about the circumferential surface of the fastener. Thus, the service or fatigue life of the resulting bolted connection is enhanced, while minimizing the possibility of an overstressed environment conducive to stress corrosion, or when used with composite materials, the possibility of delamination of the material due to excessive prestress.

In the modified construction shown in FIGS. 13-16, the lobes 25 are formed on the shank portion 32 of a blank 30, the shank being initially of right cyindrical form and of a nominal diameter conforming to the nominal diameter of a straight cylindrical bore with which the bolt is to be used. The shank portion is deformed as by means of rolling dies to form longitudinally extending wavular lobes 25 which in cross section are similar to those of the first embodiment but vary in amplitude from a minimum zero depth at the threaded end of the shank to maximum at the head.

Figure 16:
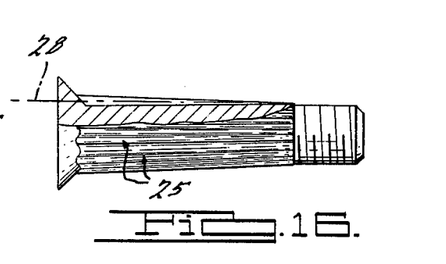
FIG. 16 is a side elevational view, partly broken away of this modified fastener.

The longitudinally extending crests 26 of the lobes diverge outwardly from the nominal cylindrical surface of the blank as they extend toward the head, and lie on the surface of a hypothetical concentric right circular cone, while the roots 27 of the lobes converge toward the head at the same angle with respect to the nominal cylindrical surface which is indicated by the broken line 28 in FIG. 16. Thus, throughout their length, the corresponding parts of the crests and roots are spaced equal radial distances outwardly and inwardly, respectively, from the nominal cylindrical circumference.

As indicated, the bolt of this embodiment is adapted to be installed in a straight, right cylindrical bore defined by the holes in the work. Inasmuch as the lobes are shallow near the leading end, insertion of the bolt is easy, and it is easily driven home in the final position shown at the right in FIG. 13, in which position the deformation of the work in the region near the head is similar to that effected in the first embodiment.

Figure 17:
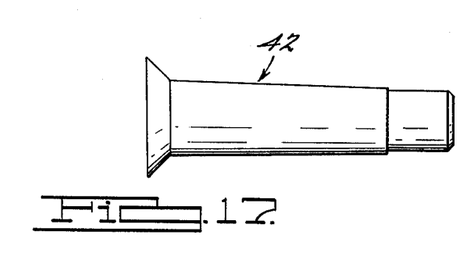
FIG. 17 is a side elevational view similar to FIG. 16 showing the blank used in manufacture of a fastener of a further modified form; and, FIG. 18 is a side elevational view partly broken away, similar to FIG. 16, showing the fastener of such further modified form.
Figure 18:
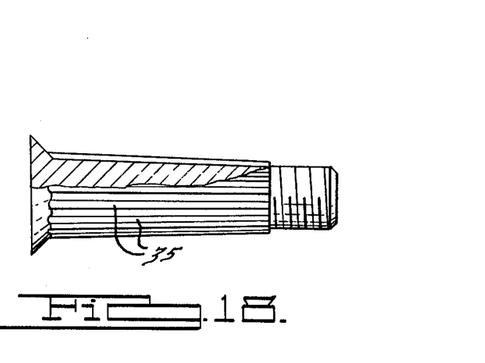

In the further modified construction in FIGS. 17 and 18 the shank of the blank 42 is initially tapered conformably to the taper of a tapered hole such as is commonly employed in connection with prior-known types of bolted fastenings used in the aircraft industry. However, the bolt of this embodiment is adapted for use in a hole which is either tapered or straight. In either case the bore is a right circular surface of revolution, which is defined as a surface lying on a right circular cone or a right circular cylinder. The lobes 35 are preferably formed by rolling, as in the previous embodiments, but are of uniform radial depth throughout their lengths. The wavelength of the sinuous cross section defined by the lobes increases uniformly from the leading end near the threads to the head. If the bolt of FIG. 17 is to be used in a tapered hole, the dimensions of the hole are preferably such that its surface would lie midway between the roots and crests if the parts could be interfitted without deformation.

If the bolt of FIG. 17 is to be used in a straight hole, the diameter of the hole may conform to the diameter of the pitch circle or mid-height diameter at a position near the head.

In the embodiment of FIG. 16, the ratio of the number of lobes to the nominal circumference of the shank portion of the bolt, and the ratio of the nominal radius of the bolt to the radius of the convex lobes is preferably the same as in the first-described embodiment.

In the embodiment of FIG. 18, corresponding ratios are preferably designed to appear near the head of the bolt.

This Detailed Description of the Preferred Forms of the Invention, and the accompanying drawings, have been furnished in compliance with the stationary requirement to set forth the best mode contemplated by the inventor of carrying out the invention. The prior portions consisting of the "Abstract of the Disclosure", "Background of the Invention" and the "Summary of the Invention" are furnished without prejudice to comply with administrative requirements of the Patent and Trademark Office.

What is claimed is:

1. A bolt for forming a controlled radially prestressed connection between a plurality of members formed of material relatively softer than the material of said bolt, said members having aligned bolt-receiving bores defining a right circular surface of revolution, said bolt including a head and having an elongated shank having a nominal conical surface of revolution, said shank having circumferentially spaced arcuate continuously undulating axially extending alternate convex lobes, the crests of which define said conical surface of revolution, and concave grooves, the number of said convex lobes divided by a nominal circumference of the shank portion of said bolt resulting in a number in the range of 14 to 32, a radius of said bolt divided by the radius of said convex lobes resulting in a number within the range of 2 to 5, corresponding portions of the crests and roots of said convex lobes and concave grooves being spaced radially outwardly and inwardly, respectively, substantially the same distance from said conical surface of revolution, said convex lobes effecting a radially outward compression of the material surrounding said bores to prestress said material to a degree sufficient to cause controlled plastic flow of said material circumferentially and radially inwardly into the concave grooves of said bolt to preclude excessive prestress of the material surrounding said bores, the maximum angle of metal flow being tangent to the arc of said convex lobes and concave grooves at the point of transition therebetween.

2. A bolt as defined in claim 1, wherein the crests of the lobes lie on a cone which diverges toward the head and the troughs lie on a cone which converges toward the head.

3. A bolt as defined in claim 1 wherein the nominal surface of revolution of the shank is a cylinder and wherein the crests of the lobes lie on a cone which diverges toward the head and the troughs lie on a cone which converges toward the head.

4. A bolt as defined in claim 1 wherein the nominal surface of revolution of the shank is a cylinder and wherein the crests of the lobes lie on a cone which diverges toward the head and the troughs lie on a cone which converges toward the head, the angle between said cylinder and each of said cones being substantially equal.

* * * * *